United States Patent Office 2,959,610
Patented Nov. 8, 1960

2,959,610

PREPARATION OF S-1-(N-SUBSTITUTED CARBAMOYL) ALKYL O,O-DIALKYL PHOSPHORODITHIOATES

Richard W. Young, Riverside, and Gerald Berkelhammer, Norwalk, Conn., assignors to American Cyanamid Company, New York, N.Y., a corporation of Maine No Drawing. Filed Jan. 23, 1959, Ser. No. 788,521

14 Claims. (Cl. 260—461)

This invention relates to phosphate esters. More particularly, it relates to an improved method of preparing S-(N-substituted carbamoyl) alkyl O,O-dialkyl phosphorodithioates.

S-(N-substituted carbamoyl) alkyl O,O-dialkyl phosphorodithioates have been described as generally useful as pesticides, petroleum additives and plasticizers among other things. Certain of these phosphate esters have demonstrated unusual insecticidal properties, particularly systemic insecticidal properties. Accordingly, there has been and continues to be considerable investigation into the pest control characteristics of these esters as well as into improved methods of preparation thereof.

Although various methods have been proposed for the preparation of S-(N-substituted carbamoyl) alkyl O,O-dialkyl phosphorodithioates, none has proved completely satisfactory in all respects. Even the conventional method, described in U.S. Patent No. 2,494,283 and others involving the reaction of a dithiophosphoric acid and an α-haloamide in the presence of a base such as sodium carbonate, suffers from certain disadvantages. One drawback, for instance, is the fact that an expensive method proceeding through an ester or acyl halide intermediate must be followed to obtain the starting α-haloamide. Moreover, only one phosphate ester can be prepared from any one particular α-haloamide even after proceeding through either of the costly routes for the preparation of the amide. Another disadvantage to the above described process is that the yield of sufficiently purified product may be poor particularly when employing O,O-dimethyl dithiophosphoric acid. This is because considerable phosphate ester is consumed presumably by the reaction thereof with the salt of the dithiophosphoric acid to form O,O-S-trimethyl phosphorodithioate. Not only is separation of the phosphate ester from the crude reaction mixture containing the trimethyl ester difficult, but this by-product reaction results in an undesirable loss of the costly halomide. Finally, it is oftentimes difficult to remove unreacted halomide from products formed by the described process.

There has remained, therfor, a demand for a procss for preparing S-(N-substituted carbamoyl) alkyl O,O-dialkyl phosphorodithioates which is not subpect to the above disadvantages. It is a principal object of this invention to provide such a process. It is a further object of the present invention to provide a process for preparing such phosphate esters by a route employing other than an expensively prepared α-haloamide. It is also an object of this invention to provide a process in which the same starting material may be employed to prepare various phosphate esters. It is a still further object of this invention to prepare phosphate esters in good yield and of high purity by an economical and simple process requiring a minimum of supervision.

According to the process of this invention, these objects have been met in a surprisingly simple yet unusually effective manner. Rather than employing an α-haloamide as a starting material, the present process employs an S-carboxyalkyl O,O-dialkyl phosphorodithtioate and, in general, comprises the reaction thereof with a halophosphite and a primary or secondary amine to obtain an S-(N-substituted carbamoyl) alkyl O,O-dialkyl phosphorodithioate in excellent yield and of high purity.

The phosphorodithioates employed in the process of the present invention are of the general formula

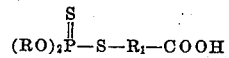

in which R is an alkyl radical such as methyl, ethyl, n-propyl, i-propyl, n-butyl, t-butyl and the like; and $R_1$ is an alkylene or alkylidene radical such as

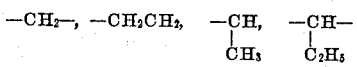

and the like. The particular method employed for the preparation of the acid does not form a part of the present invention. Nevertheless, the preparation of the acid is of considerable significance in the present process inasmuch as, in contrast to the α-haloamide of the previously discussed prior art process, it can be inexpensively and easily prepared. The S-carboxyalkyl O,O-dialkyl phosphorodithioates herein employed may be readily prepared for instance, by reacting an alkali metal salt of an O,O-dialkyl phosphoric acid with a halocarboxylic acid such as α-chloroacetic acid.

The compounds referred to above as halophosphites or as diesters of phosphorous halides are of the general formula

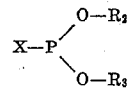

in which X is halogen and $R_2$ and $R_3$ are similar alkyl or aryl radicals such as methyl, ethyl, propyl, butyl, phenyl, tolyl, naphthyl and the like; or when taken together comprise an alkylene radical such as ethylene or propylene, or an arylene radical such as phenylene.

It is a particular feature of this invention that the same acid can be reacted with various amines to give a wide variety of phosphate esters. These amines may be represented by the general formula

in which $R_4$ and $R_5$ may be hydrogen, aliphatic or aromatic radicals or which when taken together with the nitrogen form a heterocyclic amine. In addition to ammonia, examples of aliphatic amines which may be employed in the process of this invention are primary and secondary alkylamines such as the methyl, ethyl, n-propyl, isopropyl, n-butyl, isobutyl, sec-butyl, t-butyl, isoamyl, n-hexyl, 2-ethylhexyl, n-octyl, t-octyl, dodecyl amines and the like; allylamines, such as allylamine, methylallyamine and the like; cycloalkylamines such as cyclopentylamine, methylcyclopentylamine, cyclohexylamine and the like; arylamines such as aniline, naphthylamine and the like; and heterocyclic amines such as morpholine, piperidine, methyl piperidine, dimethylpyridine, piperazine, pyrrole, pyrrolidine, and the like. As used throughout the specification and claims, the term "amine" is intended to include such primary and secondary amines as well as ammonia.

The reaction of the present process is conveniently conducted in a solvent, the choice of solvent being limited only by the requirement of inertness under the rather mild reaction conditions. Suitable solvents include, for example, the chlorinated aliphatic hydrocarbons such as carbon tetrachloride and trichlorethylene, and hydrocarbons of the benzene series such as benzene and its homologues and their halogenated derivatives, thiophene, nitrobenzene and the like. The hydrocarbons of the benzene series, including specifically benzene and toluene, are particularly suitable solvents.

During the reaction an acid acceptor is made available to fix the hydrogen halide formed during the reaction. Any of various materials may be employed for this purpose. Among these are inorganic bases such as the alkali metal carbonates and hydroxides, and amines particularly tertiary amines such as triethylamine, tributylamine, pyridine and the like. Triethylamine is a particularly convenient amine. If desired, neutralization of the hydrohalide may be practiced after the reaction is complete although it is preferable to fix it as it is formed.

The process of the present invention may be conducted by bringing together substantially simultaneously each of the reactants as well as the hydrohalide acceptor in about equimolecular proportion. Preferably, however, the desired S-carboxyalkyl O,O-dimethyl phosphorodithioate and a halophosphite are brought together with agitation in a suitable solvent in the presence of an acid acceptor. Agitation is continued until the intermediate mixed anhydride of the phosphate ester is formed and the amine hydrohalide precipitated. The hydrohalide is then separated by conventional means and a substantially equimolecular amount of the desired amine added to the residual reaction mass with agitation. The reaction mixture is kept cool until reaction is substantially complete, after which the precipitated phosphite is separated and the product worked up in a conventional manner as by washing with water and potassium bicarbonate, drying and removal of solvent by distillation.

The reaction is found to proceed quite readily at normal or slightly below or above normal room temperature. Extremes of temperature in either direction are unnecessary. The reaction in which the mixed anhydride is formed is completed with agitation in a matter of minutes. The subsequent reaction of the mixed anhydride with the desired amine requires a somewhat longer period of time, the reaction time varying with the particular phosphate ester being prepared.

As previously indicated, the process of the instant invention is of particular advantage in that the same S-carboxyalkyl O,O-dialkyl phosphorodithioate intermediate may be employed to prepare a variety of phosphate esters. This is in distinct contrast to known procedures in which a different α-haloamide intermediate must first be prepared for the preparation of each phosphate ester. Thus, in the present process, numerous phosphate esters may be made from an originally prepared acid merely by varying the amine. That it is possible to obtain this advantage as well as those others pointed out herein is particularly surprising. Because of the excessive sensitivity of phosphate esters, it has heretofore been the practice in the preparation of S-(N-substituted carbamoyl) alkyl O,O-dialkyl phosphorodithioates to introduce this reactant into the reaction mixture last. It is quite unexpected, therefore, and contrary to previous belief that these compounds could be readily prepared in good yield and high purity by a process in which the phosphate ester is introduced in the reaction mixture first.

The invention is further illustrated by the following examples. Unless otherwise noted, all parts are by weight.

EXAMPLE 1

S-(METHYLCARBAMOYL)METHYL O,O-DIMETHYL PHOSPHORODITHIOATE

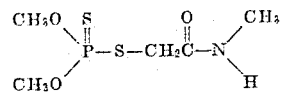

A solution of 6.33 parts (0.05 mol) of O,O-ethylene chlorophosphite in 15 parts of dry benzene is added over a five-minute period to a solution of 10.8 parts (0.05 mol) of S-carboxymethyl O,O-dimethyl phosphorodithioate and 5.05 parts (0.05 mol) of triethylamine in 70 parts benzene with stirring, the temperature being kept at 20–25° by means of an ice bath. After an additional five minutes stirring at room temperature, the precipitated triethylamine hydrochloride is filtered off and washed with benzene. The combined filtrate and washings are cooled in an ice bath while 1.55 parts (0.05 mol) of methylamine in 10 parts of benzene are added with stirring. The reaction mixture is removed from the ice bath and allowed to warm to 17° C. and then refrigerated for 40 hours. The benzene solution is then decanted from the precipitated ethylene phosphite and washed with 15 parts of water and 25 parts of saturated potassium bicarbonate solution. Drying over magnesium sulfate and removal of the solvent under vacuum leaves a colorless oil. This is dissolved in 15–20 parts of toluene and precipitated out with excess hexane to give 4.65 parts of S-(N-methylcarbamoyl) methyl O,O-dimethyl phosphorodithioate as a white solid. Yield is 40.5%; M.P. 49–51.5° C.

EXAMPLES 2–19

The procedure of Example 1 is repeated substituting molecular equivalents of diethylchlorophosphite, of different amines and of different S-carboxymethyl O,O-dialkyl phosphorodithioates. The products formed are of the general formula

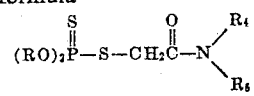

in which R, $R_4$ and $R_5$ have the values indicated in Table I.

Table I

| Example | R | $R_4$ | $R_5$ |
| --- | --- | --- | --- |
| 1 | $CH_3$ | H | H |
| 2 | $CH_3$ | $C_2H_5$ | H |
| 3 | $CH_3$ | i-$C_3H_7$ | H |
| 4 | $CH_3$ | t-$C_4H_9$ | H |
| 5 | $CH_3$ | $C_6H_5$ | H |
| 6 | $CH_3$ | —N○O— | |
| 7 | $CH_3$ | $CH_3$ | $CH_3$ |
| 8 | $CH_3$ | $C_2H_5$ | $C_2H_5$ |
| 9 | $CH_3$ | $CH_2CH=CH_2$ | H |
| 10 | $C_2H_5$ | H | H |
| 11 | $C_2H_5$ | $CH_3$ | H |
| 12 | $C_2H_5$ | $C_2H_5$ | H |
| 13 | $C_2H_5$ | i-$C_3H_7$ | H |
| 14 | $C_2H_5$ | $C_8H_{17}$ | H |
| 15 | $C_2H_5$ | $C_4H_9$ | $C_4H_9$ |
| 16 | $C_2H_5$ | —N○— | |
| 17 | $C_3H_7$ | H | H |
| 18 | $C_3H_7$ | $CH_3$ | H |
| 19 | $C_3H_7$ | $C_2H_5$ | $C_2H_5$ |

EXAMPLE 20

S-1-[(N-METHYLCARBAMYL)ETHYL] O,O-DIMETHYL PHOSPHORODITHIOATE

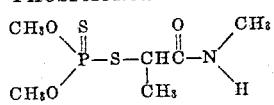

The procedure of Example 1 is repeated using 11.5 parts (0.05 mol) of S-1-carboxyethyl O,O-dimethyl phosphorodithioate, 12.6 parts (0.05 mol) of diphenyl chlorophosphite, 1.86 parts (0.06 mol) of methylamine, and 5.05 parts (0.05 mol) of triethylamine. Following the addition of the methylamine, the reaction mixture is stirred for 90 minutes at ice temperature and 75 minutes at room temperature. The work-up procedure of Example 1 gives 4.5 parts (37%) of crude solid. Two recrystallizations from ether yield S-1-(N-methylcarbamoyl) ethyl] O,O-dimethyl phosphorodithioate of M.P. 49.5–51° C.

EXAMPLES 21–26

The procedure of Example 21 is repeated substituting molecular equivalents of ethylene chlorophosphite of different amines and of different S-carboxyalkyl O,O-dialkyl phosphorodithioates. The products formed are of the general formula

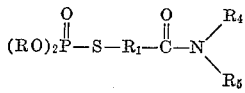

in which R, $R_1$, $R_4$ and $R_5$ have the values indicated in Table II.

Table II

| Example | R | $R_1$ | $R_4$ | $R_5$ |
|---|---|---|---|---|
| 22 | $CH_3$ | $CH_2CH_2$ | $CH_3$ | H. |
| 23 | $CH_3$ | $CH(C_2H_5)$ | $CH_3$ | H. |
| 24 | $C_2H_5$ | $CH(CH_3)$ | $CH_3$ | H. |
| 25 | $C_2H_5$ | $CH_2CH_2$ | H | H. |
| 26 | $C_2H_5$ | $CH_2CH_2$ | $C_6H_5$ | H. |
| 27 | $C_2H_5$ | $CH_2CH_2$ | $CH_3$ | $CH_3$. |

The above examples illustrate the process of the present invention. Those skilled in the art may readily appreciate that numerous phosphate esters in addition to those described can be prepared by varying the amine and/or the S-carboxyalkyl O,O-dialkylphosphorodithioate. Similarly, it will be appreciated that the reaction may be conducted just as readily in various solvents as well as with various halophosphites and hydrohalide acceptors all as previously described without departing from the essence of the invention.

We claim:

1. A process of preparing an S-(N-substituted carbamoyl) alkyl O,O-dialkyl phosphorodithioate of the formula:

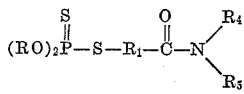

wherein R is a lower alkyl radical, $R_1$ is a member of the group consisting of lower alkylene and lower alkylidene radicals, $R_4$ is a member of the group consisting of hydrogen, lower alkyl, lower alkenyl and phenyl radicals, $R_5$ is a member of the group consisting of hydrogen and a lower alkyl radical, and

when joined together are members of the group consisting of morpholino and pyrrolidinyl radicals, which comprises: reacting an S-carboxyalkyl O,O-dialkyl phosphorodithioate of the formula

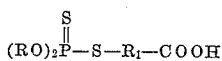

wherein R is a lower alkyl radical and $R_1$ is a member of the group consisting of lower alkylene and lower alkylidene radicals; a halophosphite of the formula

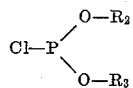

wherein $R_2$ and $R_3$ are members of the group consisting of lower alkyl, phenyl, tolyl and naphthyl radicals, and $R_2$ and $R_3$ together form a radical of the group consisting of ethylene, propylene and phenylene; and an amine of the formula

wherein $R_4$ and $R_5$ have the meaning hereinbefore given; and separating the thus-formed S-(N-substituted carbamoyl) alkyl, O,O-dialkyl phosphorodithioate from the reaction mass.

2. A process of preparing an S-(N-substituted carbamoyl) alkyl O,O-dialkyl phosphorodithioate of the formula:

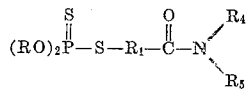

wherein R is a lower alkyl radical, $R_1$ is a member of the group consisting of lower alkylene and lower alkylidene radicals, $R_4$ is a member of the group consisting of hydrogen, lower alkyl, lower alkenyl and phenyl radicals, $R_5$ is a member of the group consisting of hydrogen and a lower alkyl radical, and

when joined together are members of the group consisting of morpholino and pyrrolidinyl radicals which comprises: bringing together in an inert organic solvent and in the presence of a hydrohalide acceptor an S-carboxyalkyl O,O-dialkyl phosphorodithioate of the formula

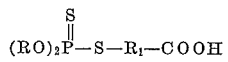

wherein R is a lower alkyl radical and $R_1$ is a member of the group consisting of lower alkylene and lower alkylidene radicals; a halophosphite of the formula

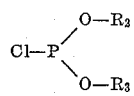

wherein $R_2$ and $R_3$ are members of the group consisting of lower alkyl, phenyl, tolyl and naphthyl radicals, and $R_2$ and $R_3$ together form a radical of the group consisting of ethylene, propylene and phenylene; and an amine of the formula

wherein $R_4$ and $R_5$ have the meaning hereinbefore given; and separating the thus-formed S-(N-substituted carbamoyl) alkyl, O,O-dialkyl phosphorodithioate from the reaction mass.

3. A process according to claim 2 in which all the reactants are brought together substantially simultaneously.

4. A process according to claim 2 in which the acid and the halophosphite are first reacted to form a mixed anhydride and the hydrohalide fixed by the acid acceptor is separated prior to reacting the mixed anhydride with the amine.

5. A process according to claim 4 in which the acid is S-carboxymethyl O,O-dimethyl phosphorodithioate and the amine is a lower alkylamine.

6. A process according to claim 5 in which the amine is methylamine.

7. A process according to claim 5 in which the amine is ethylamine.

8. A process according to claim 5 in which the amine is isopropylamine.

9. A process according to claim 5 in which the amine is t-butylamine.

10. A process according to claim 4 in which the acid is S-carboxymethyl O,O-diethyl phosphorodithioate and the amine is a lower alkylamine.

11. A process according to claim 10 in which the amine is methylamine.

12. A process according to claim 10 in which the amine is ethylamine.

13. A process according to claim 10 in which the amine is isopropylamine.

14. A process according to claim 10 in which the amine is t-butylamine.

No references cited.